April 11, 1961   F. E. BIRTCH ET AL   2,978,843
APPARATUS FOR GRINDING DOUBLE-ENVELOPING WORM ELEMENTS
Filed May 29, 1956   6 Sheets-Sheet 3

INVENTORS
Fred E. Birtch
Bernard H. Johnson
BY
Harness, Dickey & Pierce
ATTORNEYS April 11, 1961   F. E. BIRTCH ET AL   2,978,843
APPARATUS FOR GRINDING DOUBLE-ENVELOPING WORM ELEMENTS
Filed May 29, 1956   6 Sheets-Sheet 4

INVENTORS.
Fred E. Birtch
Bernard H. Johnson
BY
Harness, Dickey & Pierce
ATTORNEYS.

April 11, 1961 F. E. BIRTCH ET AL 2,978,843
APPARATUS FOR GRINDING DOUBLE-ENVELOPING WORM ELEMENTS
Filed May 29, 1956 6 Sheets-Sheet 5

Fig. 7

INVENTORS
Fred E. Birtch
Bernard H. Johnson
BY
Harness, Dickey & Pierce
ATTORNEYS

United States Patent Office 2,978,843
Patented Apr. 11, 1961

2,978,843
APPARATUS FOR GRINDING DOUBLE-ENVELOPING WORM ELEMENTS

Fred E. Birtch, Bloomfield Township, Oakland County, and Bernard H. Johnson, Traverse City, Mich., assignors to Michigan Tool Company, Detroit, Mich., a corporation of Delaware Filed May 29, 1956, Ser. No. 588,041

12 Claims. (Cl. 51—33)

This invention relates to apparatus for grinding worm elements and, more particularly, to improved apparatus for grinding double-enveloping or cone-drive-type worm elements.

Double-enveloping worm elements of the indicated character are characterized in that, in the midplane of the worm element, the helical thread form is straight-sided or rectilinear, and lines drawn in the midplane as extensions of the helical thread flanks all lie tangent to a common circle. This circle is conventionally known as the base circle of the worm wheel, and the axis of the base circle coincides with the axis of the worm wheel which is of mating capacity with the worm element when the worm wheel is positioned at the correct center distance from the worm element. In addition, in double-enveloping or cone-drive-type worm elements, the helix or thread angle of the worm element changes continuously at any one radius point and along the entire enveloping thread contour, i.e., there is a continual change of the thread angle at the pitch line of the worm thread throughout the entire thread length. Furthermore, in a radial plane there is a differential of helix between the bisecting point at the tip of the worm thread and the bisecting point at the root of the worm thread, and this last-mentioned differential is not the same as the tip-root helix differential in a radial plane at other locations from the center of the thread to either end of the thread.

An object of the present invention is to overcome disadvantages in prior apparatus for grinding worm elements of the indicated character and to provide improved apparatus for grinding the full depth of the thread form of double-enveloping worm elements simultaneously.

Another object of the present invention is to provide improved apparatus for grinding the true lead of the double-enveloping worm threads throughout the length of the worm elements.

Another object of the present invention is to provide improved apparatus for grinding the true form of the thread flank for its entire effective length to a degree of accuracy which meets commercial tolerances with respect to the lead and pressure angle.

Another object of the present invention is to provide improved apparatus for grinding double-enveloping worm threads incorporating improved means for dressing a grinding wheel to compensate for the tip-root helix variation of the worm thread without modifying the true lead at the pitch line of the thread.

Another object of the invention is to provide improved apparatus for grinding double-enveloping worm elements which reduces the time, labor and expense of grinding such elements.

Another object of the present invention is to provide improved apparatus for grinding double-enveloping worm elements that is economical to manufacture and assemble, durable, efficient and reliable in operation.

Another object of the present invention is to provide improved apparatus for grinding double-enveloping worm elements which may be installed as an accessory on or which may be made a part of the original equipment of a conventional double-enveloping worm generating machine.

The above as well as other objects and advantages of the present invention will become apparent from the following description, the appended claims and the accompanying drawings wherein:

Referring to the drawings, the present invention is shown incorporated in apparatus, generally designated 10, which is particularly adapted for use in grinding double-enveloping or cone-drive-type worm elements and which is shown in installed relationship with respect to a fragmentarily illustrated conventional double-enveloping worm element generating machine 12 that may, for example, be of the type illustrated in Patent 2,408,949, issued to H. Pelphrey, and assigned to the assignee of the present invention. For the purposes of the present invention, it is sufficient to state that the machine 12 includes a rotatable work table 14 and head and tail stock members 16 and 18, and the worm element 20 which is to be ground is mounted between the head and tail stock members. The head stock spindle 22 and the tail stock spindle 24 which carry the worm element 20 are disposed on an axis perpendicular to the axis of rotation of the table 14, and the worm element 20 is driven in geared timed relationship with respect to the table 14, as will be appreciated by those skilled in the art. As more fully described in the aforementioned patent, means is also provided for imparting a side feed to the table 14 of such generating machines by rotating the table about its axis while the correct center distance, end position and side positions of the worm element, and the geared time relationship are maintained.

The apparatus 10 embodying the present invention includes a base plate 26 which is fixed to the rotatable table 14 of the machine 12, and a support member 28 is provided which is mounted for sliding movement on ways 30 provided on the base plate 26. The support member 28 includes a bifurcated portion 32 which straddles a depending flange 34 provided on a retaining member 36 which is releasably secured to the base plate 26, as by cap screws 38 and T nuts 40. In order that the support member 28 may be moved longitudinally of the ways 30, an adjusting nut 42 is provided which is fixed to the base plate 26 by any desired or conventional means. The support member 28 includes a depending flange portion 44 through which an adjusting screw 46 projects and threadably engages the nut 42. The adjusting screw 46 includes an enlarged collar portion 48 which bears against the flange portion 44 of the support member, and the adjusting screw is retained by a stop nut 50 which may be locked in place by a set-screw 52. A dial 54 is also provided to indicate the increments of movement of the screw 46 and support member 28. The screw 46 is also provided with wrench flats 56 so that a wrench or handwheel may be conveniently applied thereto. With such a construction, when the screw 46 is advanced or retracted relative to the nut 42, the support member 28 moves longitudinally on the ways 30 of the base plate 26.

The support member 28 includes a housing portion 58 which defines a passageway 60 through which the shank portion 62 of a swivel spindle 64 projects, the longitudinal axis of the spindle 64 being disposed in the mid-plane of the worm element. The spindle 64 is supported by ball bearings 66 and 68 separated by a tubular spacer 70 and retained by a lock nut 72. A cover 74 is also provided which is retained by cap screws, such as 76, that threadably engage the housing portion 58 of the support member 28. Suitable Zerk fittings, such as 78, are also provided to facilitate the application of lubricants to the assembly. The spindle 64 includes an enlarged head portion 80 having an integral annular skirt 82 which encompasses the housing 58 and closes the end thereof remote from the cap 74. The head portion 80 of the spindle 64 also includes a radially outwardly projecting flange 83, and an angularly adjustable grinding wheel assembly, generally designated 84, is provided which is particularly adapted for use in grinding relatively low helix angle worms. The grinding wheel assembly 84 is releasably clamped to the flange 83 by a clamping member 86 retained by studs and nuts, such as 88 and 90, which threadably engage a spindle housing 92 provided on the grinding wheel assembly 84. A sector guide 94 is also provided which is secured to the housing 92 by cap screws 96.

The housing 92 carries a grinding wheel 98 which is mounted on a shaft 100 supported by a radial bearing sleeve 102 and a thrust bearing sleeve 104, the mid-point of the axis of rotation of the grinding wheel intersecting the longitudinal axis of the spindle 64. Ball bearings 106 and 108 are mounted on the sleeves 102 and 104, respectively, and retained, as by lock washers 110 and lock nuts 112. For the purpose of driving the shaft 100, a pulley 114 is provided which is fixed to the shaft 100. In order to prevent the entrance of foreign matter into the bearings, shields 116 are provided on opposite sides of the grinding wheel. Felt seals 118 are also provided between the bearing sleeves and the housing, and the ends of the housing are closed by cover members 120 and 122 retained by cap screws 124.

The housing 92 includes an integral outwardly projecting flange portion 126 upon which is mounted a conventional electric motor 128. A drive pulley 130 is fixed to the drive shaft 132 of the motor 128 and drives the pulley 114 through a belt 134.

With the above-described construction, the axis of rotation of the grinding wheel 98 may be tilted to any desired angular position about the longitudinal axis of the spindle 64 by rotating the housing 92 about the longitudinal axis of the spindle 64 and clamping the housing in the selected angularly adjusted position through the agency of the clamping member 86.

In order to maintain the true lead of the worm thread throughout the effective length of the worm thread, means is provided for tilting the grinding wheel 98 about the longitudinal axis of the spindle 64 to the varying helix or thread angles as the grinding wheel passes from end to end through the worm. Such means includes a swivel stud 136 having a head portion 138 and a shank portion 140 which projects into a longitudinally extending recess 142 provided in the spindle 64, the shank portion 140 being keyed to the spindle 64, as by a key 144. A cam follower support 146 is provided, one end of which is fixed to the head portion 138 of the swivel stud 136, as by setscrews 148. A cam follower 150 is provided which is carried by the follower support 146 at the end thereof remote from the swivel stud 136, the cam follower 150 having a shank portion 152 which projects through the follower support 146 and which is retained by a nut 154. An elongate, curved, band-type adjustable cam 156 is provided which is disposed in radially outwardly spaced relationship with respect to the table 14, with the center of curvature of the cam 156 coinciding with the axis of rotation of the table 14. In order to support the cam 156 and to facilitate the adjustment thereof, a plurality of bushings 158 are provided which are fixed to the underside of the cam 156 at angularly spaced points. Support pins 160 are provided for each of the bushings 158, each support pin projecting through a cam support 162 and being retained by snap rings 164. The cam supports 162 are slidably mounted in ways 166 defined by guide members 168 fixed to an arcuate table 170 which is secured to the base 172 of the machine 12 or other convenient support, the table 170 being disposed in radially spaced relationship with respect to the table 14. The cam supports 162 are retained in the associated ways 166 by retaining members 174 secured to the guide members 168 by cap screws 176.

Figure 1:
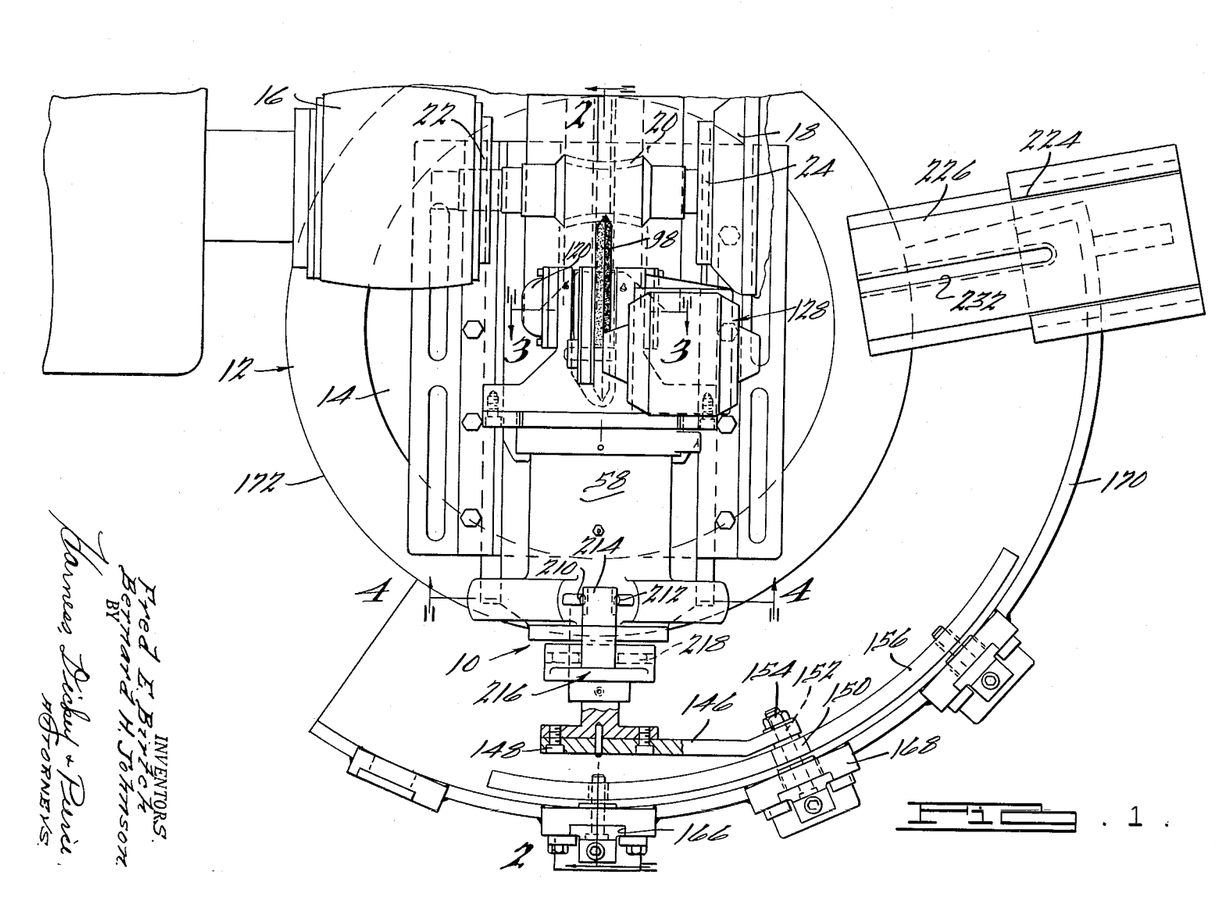
Figure 1 is a top plan view of apparatus embodying the present invention, showing the same in installed relationship with respect to a fragmentarily illustrated double-enveloping worm generating machine.
Figure 2:
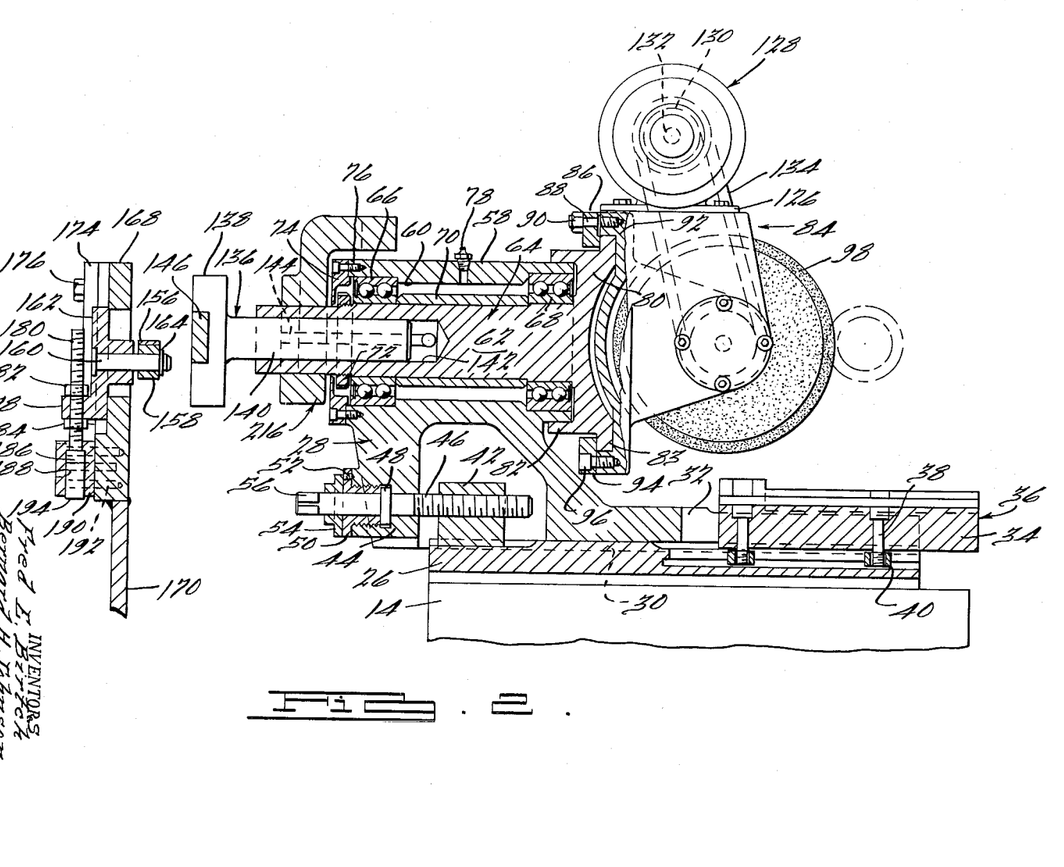
Fig. 2 is a longitudinal sectional view of the apparatus illustrated in Figure 1, taken on the line 2—2 thereof.

Each cam support 162 includes an outwardly projecting flange 178 through which an elongate screw 180 projects, the screw 180 being retained by nuts 182 and 184 disposed above and below the flange, as viewed in Fig. 2. Each screw 180 includes a head portion 186 which is disposed in a recess 188 provided in a block 190 fixed to the associated guide member 168, as by cap screws 192. A setscrew 194 is also provided which threadably engages internal threads provided in the recess 188, the inner end of the setscrew 194 bearing against the head portion 186 of the screw 180. With such a construction, the cam 156 may be deflected to the desired contour by raising or lowering the individual support members 162 relative to the guide members 168 through the agency of the screws 180. In the embodiment of the invention illustrated, three adjustment stations for the cam 156 are provided, but it will be understood that any desired number of adjustment stations may be provided to facilitate deflecting the cam to the desired contour.

With the above-described construction, after the cam 156 has been deflected to the desired contour, the movement of the cam follower 150 over the cam 156 as the table 14 rotates in geared timed relationship with respect to the worm element 20 effects a tilting of the spindle 64 so that the grinding wheel 98 is tilted to the varying helix or thread angle while passing from end to end through the worm element. Thus, the true lead of the worm thread is maintained throughout the effective length of the worm element.

In order to return the spindle 64 to the initial position whenever the cam 156 does not effect tilting of the arm 146, equalizer pins 196 and 198 are provided which are mounted in passageways 197 and 199 defined by bosses 200 and 202 provided on the housing 58 on opposite sides of the axis of the spindle 64. The equalizer pins 196 and 198 are provided with enlarged collar portions 201 and 203 which bear against internal abutment surfaces 205 and 207 that limit the axial inward movement of the pins. Coil springs 204 and 206 are provided, the inner ends of which bear against the collar portions 201 and 203 while the outer ends of the springs bear against screw plugs 208 that threadably engage the bosses 200 and 202. A centering bracket 216 is provided which is fixed to the spindle 64, as by dowel pins 218, the bracket 216 having a flange 214 extending substantially parallel to the longitudinal axis of the spindle 64 in radially upwardly spaced relationship thereto, as viewed in Fig. 4. The ends 210 and 212 of the equalizer pins 196 and 198 are spaced from the collar portions 201 and 203 respectively so as to bear against the opposite sides of the flange 214 only when the spindle 64 is tilted. The side walls of the flange 214 are beveled, as shown in Fig. 4, so that such side walls remain generally normal to the ends of the equalizer pins during tilting movement of the spindle 64.

Figure 4:
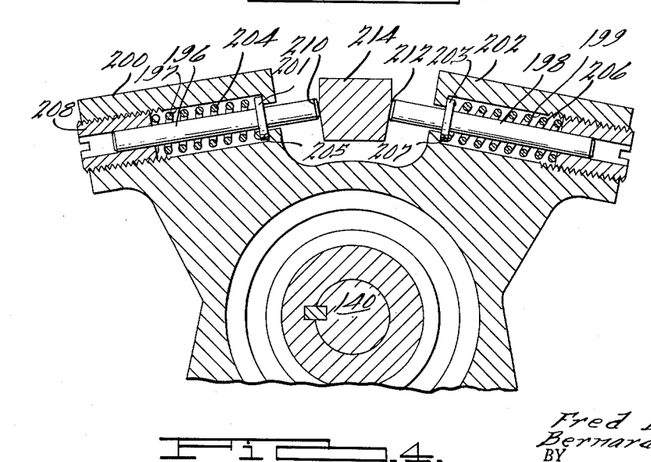
Fig. 4 is a transverse sectional view of the apparatus illustrated in Figure 1, taken on the line 4—4 thereof.
Figure 5:
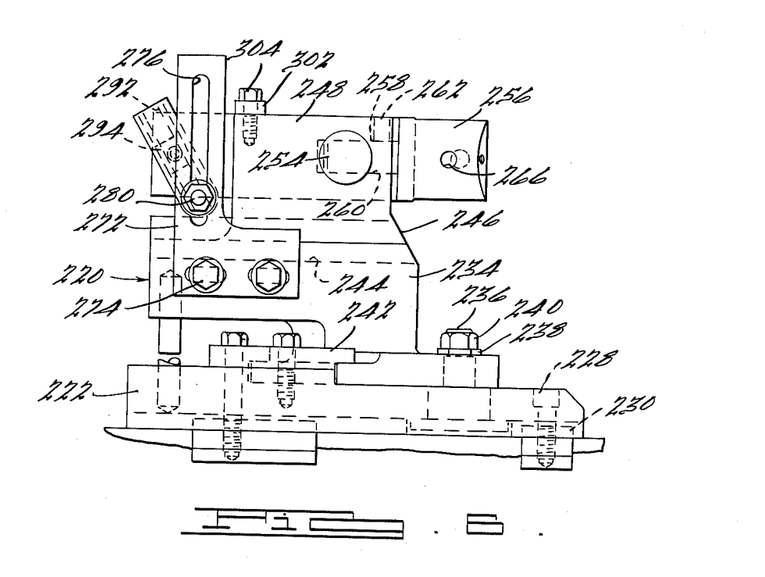
Fig. 5 is an enlarged top plan view of a grinding wheel dresser embodying the present invention.
Figure 6:
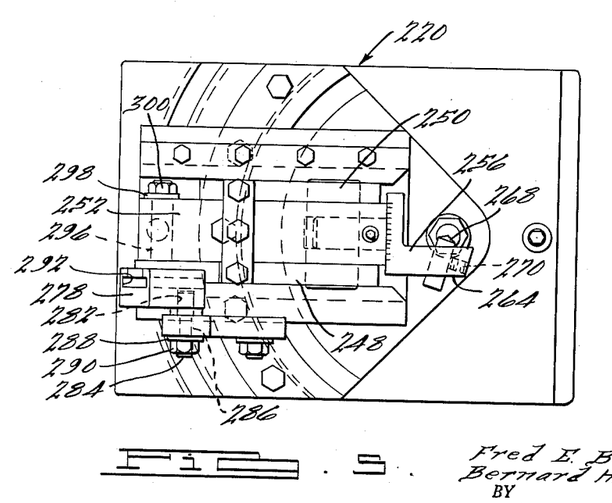
Fig. 6 is an elevational view of the structure illustrated in Fig. 5.
Figure 7:
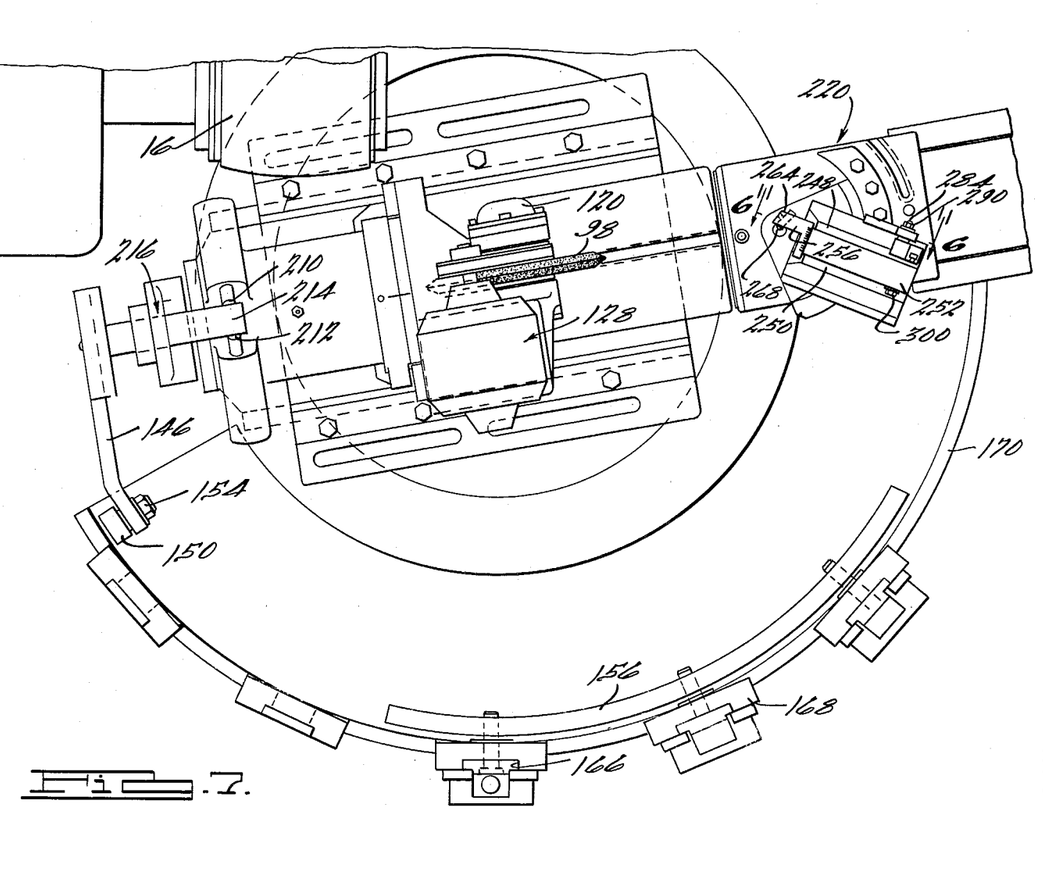
Fig. 7 is a top plan view of the apparatus illustrated in Figure 1, showing the grinding wheel dresser installed thereon.

With such a construction, when the cam 156 effects a tilting movement of the spindle 64 in the manner previously described, as, for example, a tilting movement in a counterclockwise direction as viewed in Fig. 4, the spring 204 is compressed. The pin 196 then returns the spindle 64 to the initial position whenever the cam 156 does not actuate the cam follower 150 to effect a tilting movement of the spindle.

Since the tip-root helix differential of the threads of double-enveloping worm elements is continuously changing, a modified convex curved grinding surface may be dressed on the grinding wheel 98 to fully compensate for the tip-root helix differential without affecting the true lead at the pitch line of the thread of the worm element. The present invention provides a wheel dresser, generally designated 220, which serves to dress the desired contour on the grinding wheel 98. The dresser 220 includes a base 222 which is adjustably mounted on a guide member 224 fixed to a shelf 226 provided on the arcuate table 170. The dresser base 222 is secured to the shelf 226 by screws 228 which project through the base 222 and threadably engage T nuts 230 disposed in elongate 232 provided in the shelf. A support member 234 is provided which is mounted on the upper surface of the base and which is pivotally connected to the base by a pivot-post 236 which projects through the support member and the base, the pivot-post being retained by a washer 238 and a nut 240. A clamping member 242 is provided which serves to clamp the support member 234 to the base 222 after the support member has been positioned in the desired angular relationship with respect to the grinding wheel 98. The support member 234 defines dovetail ways 244 upon which a slide member 246 is mounted. The slide member 246 includes upstanding flanges 248 and 250, and an elongate bar 252 is provided which is disposed between the flanges 248 and 250 and which is pivotally connected thereto by a pivot pin 254. The bar carries a tool holder 256 having a shank portion 258 which is disposed in a recess 260 defined by the bar 252 and which is retained in the recess by a setscrew 262. The tool holder 256 also includes a forwardly projecting portion 264 which defines a passageway 266 in which a diamond-pointed dresser 268 or other dressing tool is mounted, the dressing tool 268 being retained by a setscrew 270 so that the dressing point thereof is initially disposed in the midplane of the worm element and on the longitudinal axis of the spindle 64.

In order that the modified convex curved form may be dressed on the underside of the peripheral portion of the grinding wheel 98 after the grinding wheel has been tilted to the desired helix angle of the worm element, control means is provided for lowering and then raising the dressing tool 268 during the forward stroke of dressing. This control means is comprised of a guide bracket 272 which is fixed to the dressing support 234 as by cap screws 274. The guide bracket 272 defines an elongate vertically extending slot 276. A linkage arm 278 is provided which serves to pivot the bar 252 about the axis of the pin 254 during the forward stroke of dressing. The lower end portion of the linkage arm 278 is pivotally connected to the bracket 272 by a stud 280 which projects into a recess 282 defined by the arm 278, the stud 280 being mounted in the recess 282 so that the arm 278 is free to pivot relative to the stud. The stud 280 includes a shank portion 284 having flats 286 which project through the slot 276 defined by the bracket 272, and a retaining washer 288 and a nut 290 are provided which may be tightened to prevent movement of the stud 280 longitudinally of the slot 276. The arm 278 defines a T slot 292 in which a T nut 294 is mounted, and the T nut 294 is connected to the rear end portion of the bar 252 by a stud 296 retained by a washer 298 and a nut 300. The T nut 294 may be adjusted longitudinally of the T slot 292 and locked in the selected adjusted position by tightening the stud 296 in the nut 294 and by tightening the nut 300 on the stud.

With the nut 300 tightened on the stud 296 and the T nut 294 clamped to the arm 278 in a selected adjusted position, the modified convex curved form may be dressed on the underside of the tilted grinding wheel 98 by moving the slide member 246 forwardly on the ways 244. As the slide member 246 moves forwardly, the arm 278 pivots about the longitudinal axis of the stud 280, thereby initially raising and then lowering the rear end portion of the bar 252. Since the rear end portion of the bar 252 first raises and then lowers, the diamond-pointed dressing tool 268 initially lowers and then raises relative to the grinding wheel, thereby dressing the curved convex form on the underside of the tilted grinding wheel.

When it is desired to dress a straight angle on the grinding wheel 98, as, for example, for extremely low helix angle double-enveloping worm elements, a strap 302 is provided which extends transversely of the bar 252 and which is fixed to the flanges 248 and 250 so as to prevent upward movement of the bar 252. The strap 302 is secured to the flanges 248 and 250, as by cap screws 304. The nut 290 is also loosened so that the stud 280 is free to move longitudinally of the slot 276 in the bracket 272. With the nut loosened, when the member 246 is moved forwardly on the ways 244, the stud 280 initially moves downwardly in the slot 276 as the arm 278 pivots about the axis of the stud 280 and then moves upwardly in the slot 276 after the axis of the stud 296 passes over the axis of the stud 280. The strap 302 which bears against the upper surface of the bar 252 prevents upward movement of the rear end portion of the bar 252 and, consequently, prevents the bar from pivoting about the axis of the pin 254. Consequently, the dressing tool moves in a rectilinear path during the forward stroke of dressing and dresses a straight angle on the grinding wheel.

In the operation of the apparatus 10 to grind the flank of a double-enveloping worm thread, the workpiece is mounted between the head stock spindle 22 and the tail stock spindle 24 at the correct center distance from the axis of rotation of the work table 14. The elevation of the table 14 is also adjusted so that the longitudinal axes of the spindle 64 and the workpiece are substantially coplanar. The driving wheel spindle housing 92 is then adjusted angularly with respect to the swivel spindle 64 so as to tilt the grinding wheel to the actual starting helix angle of the thread to be ground. This starting angle may be the center helix or the end helix of the thread. After the grinding wheel spindle housing has been tilted to the desired starting helix angle, the housing 92 is clamped to the swivel spindle 64 through the agency of the clamp 86.

The desired grinding surface is then dressed on the grinding surface of the tilted grinding wheel, in the manner previously described, so as to compensate for the tip-root helix differential of the thread.

With the table 14 and the workpiece rotating in geared timed relationship, and with the correct center position, end position and side position of the workpiece and the grinding wheel maintained, the cam 156 effects the tilting of the wheel 98 to the varying helix or thread angle as the wheel passes from end to end through the workpiece. The full depth of the thread flank is thus ground simultaneously to the true form for its entire effective length.

Figure 3:
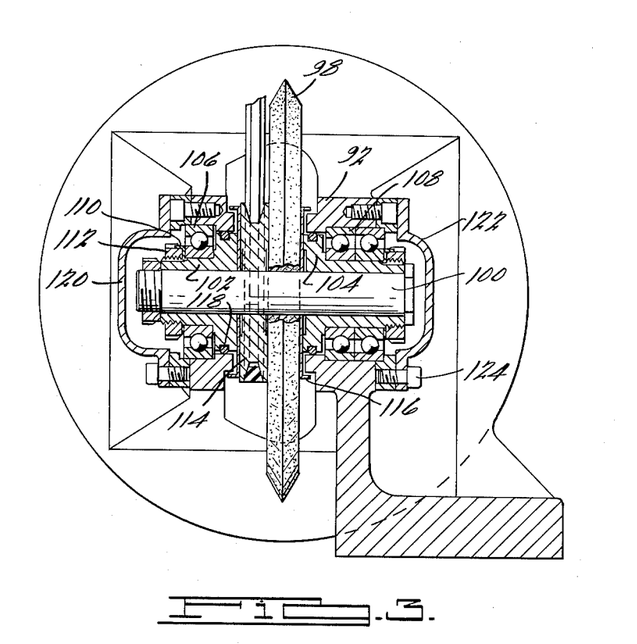
Fig. 3 is a transverse sectional view of the apparatus illustrated in Figure 1, taken on the line 3—3 thereof.
Figure 8:
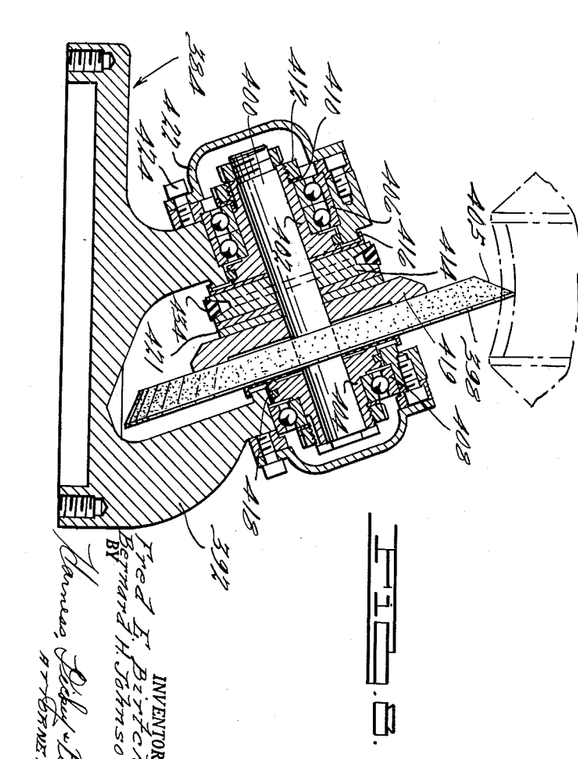
Fig. 8 is a top plan view, with portions in section, of an angularly adjustable grinding wheel assembly particularly adapted for use in grinding double-enveloping worms with an average helix angle.

In Fig. 8, a grinding wheel assembly, generally designated 384, is illustrated which is particularly adapted for use in grinding worms with an average helix angle. In this embodiment of the invention the grinding wheel is offset to provide a reduced contour radius of the grinding surface of the wheel, the more abrupt contour of the wheel permitting the grinding of worms of average helix angle without necessitating a reduction in the outside diameter of the grinding wheel from that of the grinding wheel illustrated in Fig. 3. The grinding wheel assembly 384 is adapted to be releasably clamped to the flange 83 by the clamping member 86 and retained by studs and nuts, such as 88 and 90, which threadably engage a spindle housing 392 provided on the grinding wheel assembly 384. The housing 392 carries a grinding wheel 398 which is mounted on a shaft 400 supported by bearing sleeves 402 and 404. The longitudinal axis of the shaft 400 intersects a projection of the longitudinal axis of the spindle 64 and the longitudinal axis of the shaft 400 is preferably offset with respect to the longitudinal axis of the spindle 64 so that the angle included between the grinding surface 405 and a plane passing through the grinding wheel 398 perpendicular to the longitudinal axis of the shaft 400 will be, for example, approximately 40 degrees when a worm having a 20 degree normal pressure angle is being ground.

Ball bearings 406 and 408 are mounted on the sleeves 402 and 404, respectively, and retained by lock washers 410 and lock nuts 412. For the purpose of driving the shaft 400, a pulley 414 is provided which is fixed to the shaft 400. In order to prevent the entrance of foreign matter into the bearings, shields 416 are provided on opposite sides of the grinding wheel and felt seals, such as 418, are also provided between the bearing sleeves and the housing. A conventional grinding wheel retainer 419 and spacers 421 are also provided between the grinding wheel 398 and the pulley 414 while the ends of the housing are closed by cover members 422 retained by cap screws 424. The housing 392 carries the electrical motor 128 in the manner previously described, the motor driving the pulley 414 through a belt 434.

With the above described construction, the axis of rotation of the grinding wheel 398 may be tilted to any desired angular position about the longitudinal axis of the spindle 64 by rotating the housing 392 about the longitudinal axis of the spindle 64 and clamping the housing in the selected angularly adjusted position through the agency of the clamping member 86.

The true lead of the worm thread is maintained throughout the effective length of the worm thread by tilting the grinding wheel 398 about the longitudinal axis of the spindle 64 through the agency of the cam means previously described.

Figure 9:
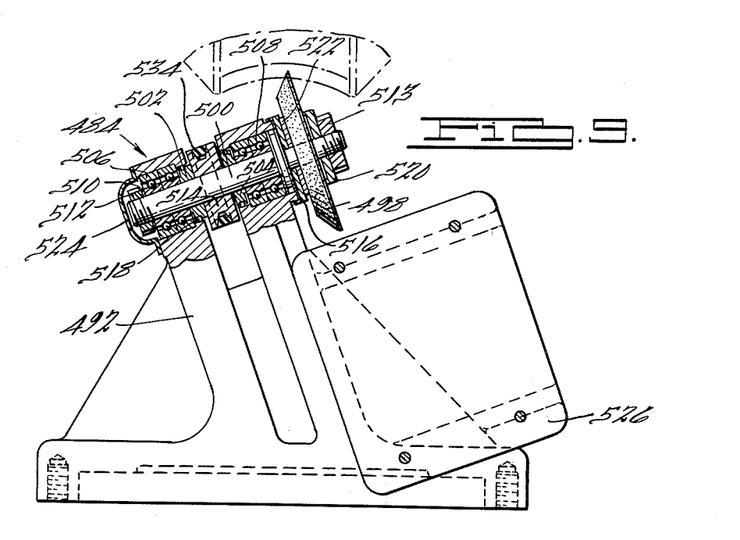
Fig. 9 is a top plan view, with portions in section, of an angularly adjustable grinding wheel assembly particularly adapted for use in grinding double-enveloping worms with a relatively high helix angle.

In Fig. 9, a grinding wheel assembly, generally designated 484, is illustrated which is particularly adapted for use in grinding worms with a relatively high helix angle. This embodiment of the invention is similar to the embodiment illustrated in Fig. 8 except that the outside diameter of the grinding wheel is reduced thereby reducing the contour radius to increase the abruptness of the wheel contour. Such a construction permits the grinding of high helix angle worms within commercial tolerances with respect to the lead and pressure angle. The grinding wheel assembly 484 is also adapted to be releasably clamped to the flange 83 by the clamping member 86 and retained by studs and nuts such as 88 and 90 which threadably engage a spindle housing 492 provided on the grinding wheel assembly 484. The housing 492 carries a grinding wheel 498 which is mounted on one end portion of a shaft 500 supported by bearing spacer members 502 and 504. The longitudinal axis of the shaft 500 intersects a projection of the longitudinal axis of the spindle 64 as previously described, and the grinding wheel 498 may be used to grind the true lead and pressure angle throughout the effective length of double-enveloping worm elements having thread angles of, for example, 25 degrees or more. Ball bearings 506 and 508 are provided, the grinding wheel 498 being mounted on one side of both the bearings 506 and 508 so that a minimum diameter wheel may be utilized, and the assembly is retained by lock washers 510 and lock nuts such as 512 and 513.

For the purpose of driving the shaft 500, a pulley 514 is provided which is fixed to the shaft 500. In order to prevent the entrance of foreign matter into the bearings, a shield 516 is provided between the grinding wheel 498 and the bearings, and felt seals such as 518 are provided between the bearing sleeves and the housing. Conventional grinding wheel retaining members and spacers such as 520 and 522 are also provided and the end of the housing remote from the grinding wheel 498 is closed by a cover member 524 retained by cap screws or other suitable means.

The housing 492 also includes an integral outwardly projecting flange portion 526 upon which the electrical motor 128 is mounted, the electrical motor driving the pulley 514 through a belt 534.

With the above described construction, the axis of rotation of the grinding wheel 498 may be tilted to any desired angular position about the longitudinal axis of the spindle 64 by rotating the housing 492 about the longitudinal axis of the spindle 64 and clamping the housing in the selected angularly adjusted position through the agency of the clamping member 86. The true lead of the worm thread is maintained throughout the effective length of the worm thread by tilting the grinding wheel 498 about the longitudinal axis of the spindle 64 through the agency of the cam means previously described.

While preferred embodiments of the invention have been shown and described, it will be understood that various changes and modifications may be made without departing from the spirit of the invention.

What is claimed is:

1. Apparatus for grinding the thread of a double-enveloping worm element comprising, in combination, means for rotatably supporting the worm element, a support member mounted for rotation in timed relationship with respect to the rotation of the worm element about an axis perpendicular to the axis of the worm to be ground, a rotatable grinding wheel having a grinding surface adapted to contact a flank of the thread on the worm element for substantially the entire depth of the thread, means pivotally connecting said grinding wheel to said support member, and means responsive to the angular movement of said support member for varying the angular position of said grinding wheel relative to the element as a function of the angular movement of said support member relative to the element.

2. Apparatus for grinding a thread of a double-enveloping worm element comprising, in combination, means for rotatably supporting the worm element, a support member mounted for rotation in timed relationship with respect to the rotation of the worm element about an axis perpendicular to the axis of the worm element to be ground, a rotatable grinding wheel having a curved grinding surface adapted to contact a flank of the thread on the worm element for substantially the entire depth of the thread, means pivotally connecting said grinding wheel to said support member, and means responsible to the angular movement of said support member for varying the angular position of said grinding wheel relative to the element as a function of the angular movement of said support member relative to the element.

3. Apparatus for grinding a thread of a double-enveloping worm element including, in combination, means for rotatably supporting the worm element, a support member mounted for rotation in timed relationship with respect to the rotation of the worm element about an axis perpendicular to the axis of the worm to be ground, a rotatable grinding wheel having a grinding surface adapted to contact a flank of the thread on the worm element for substantially the entire depth of the thread, means pivotally connecting said grinding wheel to said support member, and means including cam means responsive to the angular movement of said support member for varying the angular position of said grinding wheel relative to the worm element as a function of the angular movement of said support member relative to the worm element.

4. Apparatus for grinding a thread of a double-enveloping worm element comprising, in combination, means for supporting the worm element for rotation, a support member mounted for rotation in timed relationship with respect to the rotation of the worm element about an axis perpendicular to the axis of rotation of the worm element, a grinding wheel having a grinding surface adapted to contact a flank of the thread on the worm element for substantially the entire depth of the thread simultaneously, means connecting said grinding wheel to said support member for pivotal movement about an axis co-planar with the axis of rotation of the worm element, and means for varying the angular position of said grinding wheel relative to the worm element as a function of the angular movement of said support member about its axis of rotation.

5. Apparatus for grinding a thread of a double-enveloping worm element comprising, in combination, means for supporting the worm element for rotation, a support member mounted for rotation in timed relationship with respect to the rotation of the worm element about an axis perpendicular to the axis of rotation of the worm element, a grinding wheel having a curved convex grinding surface adapted to contact a flank of the thread on the worm element for substantially the entire depth of the thread simultaneously, means connecting said grinding wheel to said support member for pivotal movement about an axis coplanar with the axis of rotation of the worm element, and means for varying the angular position of said grinding wheel relative to the worm element as a function of the angular movement of said support member about its axis of rotation.

6. Apparatus for grinding a thread of a double-enveloping worm element including, in combination, means for supporting the worm element for rotation, a support member mounted for rotation in timed relation with respect to the angular motion of the worm element about an axis perpendicular to the axis of rotation of the worm element, a grinding wheel having a grinding surface adapted to contact a flank of the thread on the worm element for substantially the entire depth of the thread simultaneously, means connecting said grinding wheel to said support member for pivotal movement about an axis coplanar with the axis of rotation of the worm element, and means including cam means for varying the angular position of said grinding wheel relative to the worm element as a function of the angular movement of said support member about its axis of rotation.

7. Apparatus for grinding a thread of a double-enveloping worm element including, in combination, means for supporting the worm element for rotation, a support member mounted for rotation in timed relationship with respect to the rotation of the worm element about an axis perpendicular to the axis of rotation of the worm element and spaced a predetermined distance from the axis of rotation of the worm element, a grinding wheel having a curved convex grinding surface adapted to contact a flank of the thread of the worm element for substantially the entire depth of the thread simultaneously, means connecting said grinding wheel to said support member for pivotal movement about an axis coplanar with the axis of rotation of the worm element, and means including cam means for varying the angular position of said grinding wheel relative to said worm element as a function of the angular movement of said support member about its axis of rotation.

8. Apparatus for grinding a thread of a double-enveloping worm element including, in combination, a rotatable support for the worm element, a table mounted for rotation about an axis perpendicular to the axis of rotation of the worm element, said table rotating in synchronism with the rotation of the worm element, a support member fixed to said work table, a grinding wheel having a grinding surface adapted to contact a thread flank on the worm element for substantially the entire depth of the thread, means connecting said grinding wheel to said support member for tilting movement about an axis disposed in the midplane of the worm element, and cam means for tilting said grinding wheel about said last-mentioned axis as a function of the angular movement of said support member so as to tilt said grinding surface to the varying helix angles of the thread as the grinding wheel passes from end to end of the worm element.

9. Apparatus for grinding a thread of a double-enveloping worm element, including, in combination, a rotatable support for the worm element, a rotatable table mounted for rotation about an axis perpendicular to the axis of rotation of the worm element, said table rotating in synchronism with the rotation of the worm element, a support member fixed to said table, a grinding wheel having a grinding surface adapted to make substantially line contact with a flank of the thread on the worm element for substantially the entire depth of the thread, said line of contact terminating at the root of the thread and in the midplane of the worm element, a shaft for supporting said grinding wheel, means for rotating said wheel, means connecting said shaft to said support member for pivotal movement about an axis in the midplane of the worm element, means for varying the angular position of said shaft relative to said support member, and means for tilting said shaft about said last-mentioned axis as a function of the angular movement of said support member.

10. Apparatus for grinding a thread of a double-enveloping worm element, including, in combination, a rotatable support for the worm element, a rotatable table mounted for rotation about an axis perpendicular to the axis of rotation of the worm element, said table rotating in synchronism with the rotation of the worm element, a support member fixed to said table, a grinding wheel having a grinding surface adapted to make substantially line contact with a flank of the thread on the worm element for substantially the entire depth of the thread, said line of contact terminating at the root of the thread and in the midplane of the worm element, a shaft for supporting said grinding wheel, means for rotating said wheel, means connecting said shaft to said support member for pivotal movement about an axis in the midplane of the worm element, means for varying the angular position of said shaft relative to said support member, and means for tilting said shaft about said last-mentioned axis as a function of the angular movement of said support member, said means including an elongate arcuate cam, the center of curvature of said cam coinciding with the axis of rotation of said support member, and follower means operatively connected to the pivotal connection between said shaft and said support member and effective to tilt the said shaft as the follower means moves over said cam.

11. In combination with a machine having a table and a workpiece support member rotatable about mutually perpendicular axes in geared timed relationship, apparatus for grinding a thread of a double-enveloping worm element including a support member fixed to said table, a rotatable grinding wheel having a grinding surface adapted to contact a flank of the thread on the worm element for substantially the entire depth of the thread, means pivotally connecting said grinding wheel to said support member for tilting movement about an axis coplanar with the axis of rotation of the worm element, and means responsive to the angular movement of said support member for varying the angular position of said grinding wheel relative to the element as a function of the angular movement of said support member relative to the worm element.

12. In combination with a machine having a table and a workpiece support member rotatable about mutually perpendicular axes in geared timed relationship, apparatus for grinding the thread of a double-enveloping worm element including a support member fixed to said table, a grinding wheel having a curved convex grinding surface adapted to make line contact with a flank of the thread on the worm element for substantially the entire depth of the thread, means connecting said grinding wheel to said support member for tilting movement about an axis coplanar with the axis of rotation of the worm element, and means including cam means for varying the angular position of said grinding wheel relative to the worm element as a function of the angular movement of said support member.

References Cited in the file of this patent

UNITED STATES PATENTS

| | | |
|---|---|---|
| 1,980,554 | Schicht | Nov. 13, 1934 |
| 2,154,055 | Schurr | Apr. 11, 1939 |
| 2,206,842 | Indge | July 2, 1940 |
| 2,294,008 | Turrettini | Aug. 25, 1942 |
| 2,321,102 | Pelphrey | June 8, 1943 |
| 2,344,323 | Pelphrey | Mar. 14, 1944 |
| 2,380,693 | Hahir | July 31, 1945 |
| 2,408,949 | Pelphrey | Oct. 8, 1946 |
| 2,617,403 | Beauchemin | Nov. 11, 1952 |